(12) United States Patent
Yan et al.

(10) Patent No.: US 9,431,849 B2
(45) Date of Patent: Aug. 30, 2016

(54) METHOD FOR CONTROLLING THE TEMPERATURE OF AT LEAST ONE BATTERY ELEMENT, BATTERY AND MOTOR VEHICLE WITH SUCH A BATTERY

(71) Applicants: Robert Bosch GmbH, Stuttgart (DE); Samsung SDI Co., Ltd., Yongin-si, Gyeonggi-do (KR)

(72) Inventors: Xiaofeng Yan, Weinstadt (DE); Christian Pankiewitz, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 197 days.

(21) Appl. No.: 14/368,821

(22) PCT Filed: Nov. 7, 2012

(86) PCT No.: PCT/EP2012/071959
§ 371 (c)(1),
(2) Date: Jun. 26, 2014

(87) PCT Pub. No.: WO2013/097967
PCT Pub. Date: Jul. 4, 2013

(65) Prior Publication Data
US 2014/0375277 A1    Dec. 25, 2014

(30) Foreign Application Priority Data

Dec. 27, 2011   (DE) .................. 10 2011 089 962

(51) Int. Cl.
*H01M 10/44*   (2006.01)
*H01M 10/46*   (2006.01)
(Continued)

(52) U.S. Cl.
CPC .............. *H02J 7/047* (2013.01); *B60L 3/0046* (2013.01); *B60L 11/187* (2013.01);
(Continued)

(58) Field of Classification Search
CPC ...... H02J 7/0021; H02J 7/0091; H02J 7/047; H02J 7/1453
USPC .......................... 320/127, 128, 137, 150, 153
See application file for complete search history.

(56) References Cited

U.S. PATENT DOCUMENTS

| 2009/0243538 | A1 | 10/2009 | Kelty et al. |
| 2012/0158228 | A1 | 6/2012 | Biondo et al. |
| 2012/0274286 | A1* | 11/2012 | Aumayer ................. B60L 1/08 320/150 |

FOREIGN PATENT DOCUMENTS

| DE | 198 06 135 A1 | 8/1999 |
| DE | 10 2007 012 420 A1 | 9/2008 |

(Continued)

OTHER PUBLICATIONS

International Search Report corresponding to PCT Application No. PCT/EP2012/071959, mailed Feb. 19, 2013 (German and English language document) (7 pages).

*Primary Examiner* — Edward Tso
(74) *Attorney, Agent, or Firm* — Maginot, Moore & Beck LLP

(57) ABSTRACT

A method for controlling the temperature of at least one battery element, a battery, and a motor vehicle that has the battery includes specifying a temperature value, and determining the cool-down behavior of the at least one battery element beginning at a first temperature. A first point in time, at which the battery temperature will have reached or fallen below the temperature value, is determined by evaluating the cool-down behavior. Subsequently, a second point in time for a beginning of the charging or discharging of the at least one battery element is determined. If tmin<t_end, heat is applied to the at least one battery element in such a manner that the battery temperature at the second point in time is higher than or equal to the temperature value. The method can be used to avoid damage to the battery element during charging and discharging of the battery element.

10 Claims, 1 Drawing Sheet

(51) Int. Cl.
*H02J 7/04* (2006.01)
*B60L 11/18* (2006.01)
*H01M 10/0525* (2010.01)
*B60L 3/00* (2006.01)
*H01M 10/63* (2014.01)
*H01M 10/613* (2014.01)

(52) U.S. Cl.
CPC ....... *B60L 11/1874* (2013.01); *B60L 11/1875* (2013.01); *H01M 10/0525* (2013.01); *H01M 10/613* (2015.04); *H01M 10/63* (2015.04); *B60L 2240/545* (2013.01); *B60L 2240/80* (2013.01); *B60L 2260/48* (2013.01); *B60L 2260/56* (2013.01); *H01M 2220/20* (2013.01); *Y02E 60/122* (2013.01); *Y02T 10/705* (2013.01); *Y02T 10/7005* (2013.01); *Y02T 10/7011* (2013.01)

(56) References Cited

FOREIGN PATENT DOCUMENTS

| | | |
|---|---|---|
| DE | 10 2009 046 568 A1 | 5/2011 |
| DE | 10 2009 046 991 A1 | 5/2011 |
| JP | 2011-182585 A | 9/2011 |

\* cited by examiner

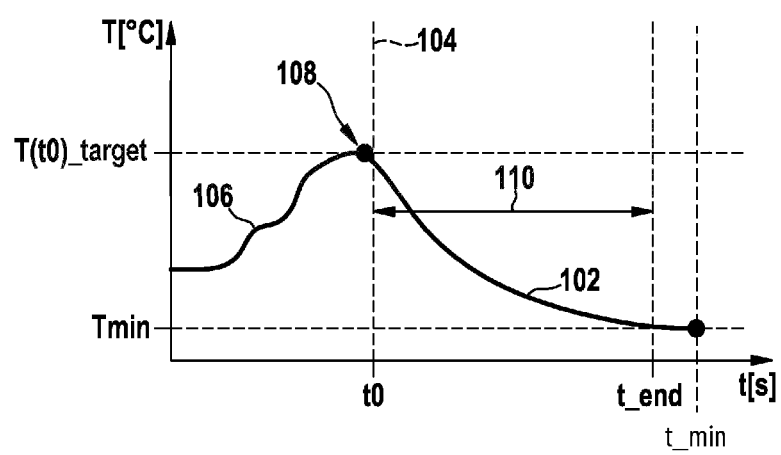

METHOD FOR CONTROLLING THE TEMPERATURE OF AT LEAST ONE BATTERY ELEMENT, BATTERY AND MOTOR VEHICLE WITH SUCH A BATTERY

This application is a 35 U.S.C. §371 National Stage Application of PCT/EP2012/071959, filed on Nov. 7, 2012, which claims the benefit of priority to Ser. No. DE 10 2011 089 962.6, filed on Dec. 27, 2011 in Germany, the disclosures of which are incorporated herein by reference in their entirety.

BACKGROUND

The present disclosure relates to a method for controlling the temperature of at least one battery element, a battery and a motor vehicle with such a battery, which can especially be used in order to prevent damage to the at least one battery element during charging or discharging of the at least one battery element.

A lithium-ion battery is a rechargeable electrical energy storage device, which is widely used in cell phones, laptops, portable consumer equipment etc. In automobile applications, lithium-ion batteries represent a key technology for the electrification of the drive system. Depending on customer requirements, different solutions can be developed, e.g. partial electrification is implemented in hybrid vehicles (HEV), and 100% electrical energy from lithium-ion batteries is used in (pure) electrical vehicles (EV). The lithium-ion batteries can, depending on operating specifications, be of modular construction and are electrically wired in series or in parallel. The battery can generally be charged both by means of the electric motor and also by means of a connection to an external network.

A significant aspect for a successful establishment of said technology is inter alia the operational safety of lithium-ion batteries. Here it is necessary to operate the battery within an optimal temperature range. This is because the battery temperature has a great influence on the provision of power, ageing (power reduction) or service life and operational safety (danger of fire). The result of this is that a well-considered thermal management concept is essential for the use of lithium-ion batteries in vehicles.

For automobile applications it is important to protect lithium-ion batteries against overheating and to prevent undercooling. A thermal management system ensures this with the necessary temperature measurement or monitoring and effective countermeasures.

With lithium-ion batteries the efficiency when charging and discharging is temperature-dependent, so e.g. at low temperatures the battery enables a significantly lower charging current or discharging current than if the battery is in an optimal operating temperature range. The result of this is that charging the battery in the winter or in cold weather below the freezing point takes significantly longer and the starting capability of the electrical vehicle or hybrid vehicle can be considerably delayed.

Moreover, a charging current or discharging current that is too high at low temperature results in irreversible damage to lithium-ion cells, so that safe operation can no longer be permanently guaranteed.

A method for determining the temperature of a vehicle battery is described in the publication DE 198 06 135 A1, wherein the temperature is calculated indirectly depending at least on the engine temperature and the ambient temperature.

A method for the operation of vehicles is known from the publication DE 10 2009 046 568 A1, whereby the temperature management of the vehicle battery takes place depending on the load profile associated with a route.

SUMMARY

According to the disclosure, with the method for controlling the temperature of at least one battery element a temperature value Tmin for the lowest temperature is specified at which charging or discharging of the at least one battery element should be carried out. Furthermore, according to the disclosure the cooling characteristic of the at least one battery element is determined, wherein the cooling starts at a temperature $T(t0)$. Preferably, the cooling characteristic describes cooling of the at least one battery element if the at least one battery element is not loaded, in particular it is not charged or discharged. A preferred embodiment provides that at least one battery element is a traction battery of a motor vehicle (EV or HEV). In this case the cooling characteristic describes cooling of the at least one battery element if the motor vehicle is switched off. Preferably, the cooling characteristic is described by a cooling curve.

According to the disclosure, it is further provided that the cooling characteristic is analyzed in order to determine a first point in time at which the battery temperature T has reduced to or has fallen below the temperature value Tmin. In particular, the analysis includes an analysis of the cooling curve. The cooling curve preferably takes into account at least one of the parameters battery temperature and ambient temperature.

Furthermore, a second point in time is determined, at which loading by charging or discharging of the at least one battery element starts again, e.g. by starting a motor vehicle. The first and the second points in time are compared in order to determine whether the loading by charging or discharging of the at least one battery element starts before the battery temperature T has reduced to or fallen below the temperature value Tmin. A check is also made as to whether the first point in time lies before the second point in time. If the first point in time lies before the second point in time, this means that the loading of the at least one battery element would take place at too low a temperature. In order to prevent this, the at least one battery element is subjected to heat, e.g. by a heating element. The application of heat takes place such that the battery temperature T at the second point in time is higher than or equal to the temperature value Tmin.

In a preferred embodiment it is provided that in the case in which the first point in time precedes the second point in time, a target battery temperature $T(t0)\_target$ is determined which, with the determined cooling characteristic, results in the first point in time being after the second point in time or the first and the second point in time being identical without an (additional) application of heat.

The temperature is thus determined which the battery would have at least had to have at the start of cooling, so that based on the determined cooling characteristic the battery falls below the temperature value Tmin at the second point in time without heating the battery.

A preferred embodiment provides that the target battery temperature $T(t0)\_target$ is determined by extrapolation of the cooling curve.

In another preferred embodiment, it is provided that the temperature of the at least one battery element is regulated during the use of the at least one battery element, especially when driving an electrically powered motor vehicle, such that the battery temperature T at the end of the use is at least as high as the target battery temperature T(t0)_target. It is thereby achieved that the cooling process that is used after the use of the at least one battery element starts at the target battery temperature T(t0)_target, and thus the at least one battery element is not cooled below Tmin prior to the second point in time. The control can thereby provide that active cooling is adapted to the target battery temperature T(t0)_target depending on a load profile of the use, especially when driving before switching the motor vehicle off. In particular, the cooling ends earlier depending on the load profile.

In another preferred embodiment it is provided that the battery temperature for a number of uses, especially journeys, is stored and analyzed. Adaptive methods are preferably used for the analysis, especially e.g. fuzzy logic, because fuzzy logic is particularly well suited to learning usage behavior or driving behavior. Moreover, the temperature profiles with the corresponding thermal management and the corresponding control parameters are especially also stored and analyzed.

One preferred embodiment provides that the analysis of the usage includes a classification of usages. For example, journeys to and from work with essentially identical or similar parameter values such as load profile, departure times and stationary periods can form a first class, shopping trips at the weekend can form a second class or journeys in a defined season can form a third class. A defined class-specific cooling characteristic corresponds to each of said classes and a class-specific target battery temperature T(t0)_target is preferably associated with each class.

Another aspect of the disclosure relates to a battery that is combined with a module, wherein the module is arranged such that a method for controlling the temperature of the battery can be implemented, wherein the method includes at least the following steps:

specifying a temperature value Tmin,
determining a cooling characteristic of the at least one battery element starting at a first temperature T(t0),
by analysis of the cooling characteristic, determining a first point in time at which the battery temperature T reaches the temperature value Tmin or has fallen below the temperature value Tmin,
determining a second point in time for a start of charging or discharging of the at least one battery element,
if the first point in time precedes the second point in time, applying heat to the at least one battery element such that the battery temperature T at the second point in time is higher than or equal to the temperature value Tmin.

Preferably, the battery is a lithium-ion battery or the battery comprises electrochemical cells in the form of lithium-ion battery cells.

Another aspect of the disclosure relates to a motor vehicle with an electrical drive motor for driving the motor vehicle and with a battery that is connected or can be connected to the electrical drive motor according to the aspect of the disclosure described in the preceding paragraph. However, the battery is not restricted to such a purpose, but can also be used in other electrical systems.

Advantageous developments of the disclosure are specified in the dependent claims and described in the description.

BRIEF DESCRIPTION OF THE DRAWINGS

Exemplary embodiments of the disclosure are explained in detail using the figure and the following description. In the figure:

FIG. 1 shows a basic illustration of an exemplary pre-control of the battery temperature by a temperature management means when driving an EV.

DETAILED DESCRIPTION

The disclosure will be explained in greater detail below for exemplary pre-control of the battery temperature T. It should be emphasized that the disclosure is not limited to said special exemplary embodiment. Rather, other methods that implement a minimum temperature for the start of charging or discharging of at least one battery element, e.g. a battery, are only included by the disclosure if the methods implement all features of the independent claim.

An exemplary thermal management system for pre-control of the battery temperature T_target will be described below with reference to FIG. 1.

According to the exemplary embodiment, a lowest battery temperature Tmin is specified, e.g. a temperature between approx. 6° C.-15° C., preferably between 8° C.-12° C., particularly preferably a temperature of approx. 10° C. Preferably, a switch-on point for battery heating is determined by said lowest battery temperature Tmin. The battery heating can thereby be started on reaching the lowest battery temperature Tmin or at an earlier point in time. Preferably, the battery temperature T is essentially regulated by the battery heating to the lowest battery temperature Tmin. This has the advantage that no energy is wasted through a battery temperature that is too high.

According to the exemplary pre-control of the battery temperature T, a cooling curve 102 is estimated or obtained by adaptive determination. The cooling curve 102 thereby represents the future temperature characteristic of the battery. During the derivation of the cooling curve 102, the ambient temperature and the battery temperature T are taken into account and are monitored for this purpose.

From the derived cooling curve 102, information such as e.g. the rate of cooling, the time to reach the lowest battery temperature Tmin or similar are determined. Moreover, in a special embodiment the battery temperature T(t0) at the start 104 of cooling is determined and the starting point in time t_end for the charging or discharging of the battery, also referred to as the second point in time, is determined.

From the cooling curve 102, the point in time tmin, also referred to as the first point in time, at which the battery temperature T will have reached the lowest battery temperature Tmin is determined. The time to reach said point in time tmin is compared with the time at which a renewed charging or discharging of the battery starts, e.g. by starting the battery powered vehicle again. If the cooling time (tmin−t0) is less than the time 110 from switching off the motor vehicle until starting the charging or discharging (t_end−t0), e.g. until starting the vehicle, the cooling curve 102 is extrapolated into the past in order to determine a target battery temperature T(t0)_target that the battery should have had when switching the electrically powered motor vehicle off. The target battery temperature T(t0)_target is thus the battery temperature that, according to the cooling curve 102, results in the battery not cooling to below the lowest battery temperature Tmin up to the start of the renewed charging or discharging. If e.g. a motor vehicle with a battery that has at least the target battery temperature T(t0)_target is switched off, the battery does not cool to below the lowest battery temperature Tmin by the time of renewed charging or discharging and heating of the battery is not necessary.

The start of the renewed charging or discharging can e.g. be given by the time at which the driver usually starts.

A special exemplary embodiment provides that the profile 106 of the battery temperature T(t) from journeys is stored and analyzed. Adaptive methods are suitable for this, e.g. the use of fuzzy logic, which is very good for learning driving behavior and the profile 106 of the battery temperature T(t) with corresponding thermal management and/or control parameters. The driving behavior can thereby e.g. include driving cycles (such as journeys to and from work, urban or highway journeys or similar), switch-off options, seasons etc. Various categories of driving behavior can be derived from said information and stored. Each category is preferably allocated its own special category-specific target battery temperature T(t0)_target.

It is also provided that the determined target battery temperature T(t0)_target is compared with the permitted maximum battery temperature T_max.

If a target battery temperature T(t0)_target is determined that exceeds the permitted maximum battery temperature T_max, T(t0)_target=T_max is set.

In the exemplary embodiment, it is further provided that the target battery temperature T(t0)_target is specified as the target temperature 108 for the end of the next journey. It is thereby determined in which category the next journey belongs. This can be carried out by analysis of the driving behavior, of the profile 106 of the battery temperature T(t), of the thermal management and/or of the control parameters during the journey. After determining the category of the journey, a category-specific target battery temperature T(t0)_ target is set as the target temperature 108 for the end of the journey. The active control of the temperature of the battery is then carried out such that the battery temperature at the end of the journey is not lower than the target battery temperature T(t0)_target set for this journey. In particular, the active cooling during the journey is adapted to said target battery temperature T(t0)_target. Depending on the predicted residual power profile, the point in time for switching off the cooling is determined in advance.

For active communications with the driver, an estimated time period in which the battery will be cooled to the lowest battery temperature Tmin can be transmitted to the driver and output audibly or visually.

Moreover, the estimated point in time of reaching the lowest battery temperature Tmin can be used as a trigger signal for automatic heating or for programmed parking heating.

The disclosure is not limited in its embodiment to the previously specified preferred exemplary embodiments. Rather, a number of variants are conceivable that make use of the method according to the disclosure, the battery according to the disclosure and the motor vehicle according to the disclosure, even with fundamentally different embodiments.

The invention claimed is:

1. A method for controlling the temperature of at least one battery element, comprising:
   specifying a temperature value;
   determining a cooling characteristic of the at least one battery element starting at a first temperature;
   determining a first point in time tmin at which the battery temperature reaches the temperature value or has fallen below the temperature value by analysis of the cooling characteristic;
   determining a second point in time t_end for a start of charging or discharging of the at least one battery element; and
   if tmin <t_end, applying heat to the at least one battery element such that the battery temperature at the second point in time t_end is higher than or equal to the temperature value.

2. The method as claimed in claim 1, wherein in the case in which tmin <t_end, a target battery temperature is determined that results in tmin >t_end applying for the determined cooling process.

3. The method as claimed in claim 2, wherein the target battery temperature is determined by extrapolation of the determined cooling characteristic.

4. The method as claimed in claim 2, wherein the battery temperature during the use of the at least one battery element is regulated such that the battery temperature at the start of the cooling is higher than or equal to the target battery temperature.

5. The method as claimed in claim 4, wherein different types of use are defined and a specific target battery temperature is determined for each type of use.

6. The method as claimed in claim 5, wherein one or more of a usage characteristic, the profile of the battery temperature, and parameters configured to regulate the profile of the battery temperature are analyzed for the definition of the type of use.

7. The method as claimed in claim 5, wherein adaptive methods are used for definition of the type of use.

8. The method according to claim 1, wherein one or more of the ambient temperature and the battery temperature are monitored to determine the cooling characteristic.

9. A battery, comprising:
   a module configured to implement a method for controlling the temperature of the battery, the method including:
     specifying a temperature value;
     determining a cooling characteristic of at least one battery element of the battery starting at a first temperature;
     determining a first point in time tmin at which the battery temperature reaches the temperature value or has fallen below the temperature value by analysis of the cooling characteristic;
     determining a second point in time t_end for a start of charging or discharging of the at least one battery element; and
     if tmin <t_end, applying heat to the at least one battery element such that the battery temperature at the second point in time t_end is higher than or equal to the temperature value.

10. A motor vehicle, comprising:
    an electrical drive motor configured to drive the motor vehicle; and
    a battery configured to be connected to the electrical drive motor, the battery including:
      a module configured to implement a method for controlling the temperature of the battery, the method including:
        specifying a temperature value;
        determining a cooling characteristic of at least one battery element of the battery starting at a first temperature;
        determining a first point in time tmin at which the battery temperature reaches the temperature value or has fallen below the temperature value by analysis of the cooling characteristic;
        determining a second point in time t_end for a start of charging or discharging of the at least one battery element; and if tmin <t_end, applying heat to the at least one battery element such that the battery temperature at the second point in time t_end is higher than or equal to the temperature value.

* * * * *